(12) United States Patent
Guo

(10) Patent No.: US 11,287,736 B2
(45) Date of Patent: Mar. 29, 2022

(54) COMPOUND EYE ILLUMINATION SYSTEM AND PROJECTION METHOD OF LCD PROJECTOR

(71) Applicant: NANHUA INTELLIGENT PRECISION MACHINE (SHENZHEN) CO., LTD., Guangdong (CN)

(72) Inventor: Hanwen Guo, Guangdong (CN)

(73) Assignee: NANHUA INTELLIGENT PRECISION MACHINE (SHENZHEN) CO., LTD, Guangdong (CN)

( * ) Notice: Subject to any disclaimer, the term of this patent is extended or adjusted under 35 U.S.C. 154(b) by 0 days.

(21) Appl. No.: 17/129,883

(22) Filed: Dec. 21, 2020

(65) Prior Publication Data

US 2021/0109431 A1 Apr. 15, 2021

(30) Foreign Application Priority Data

Nov. 4, 2020 (CN) .......................... 202011220122.3

(51) Int. Cl.
*G03B 21/20* (2006.01)
*G03B 21/00* (2006.01)

(52) U.S. Cl.
CPC ......... *G03B 21/208* (2013.01); *G03B 21/006* (2013.01); *G03B 21/2033* (2013.01); *G03B 21/2073* (2013.01)

(58) Field of Classification Search
CPC .......................... G03B 21/208; G03B 21/006; G03B 21/2033; G03B 21/2073
USPC .......................................................... 353/20
See application file for complete search history.

(56) References Cited

U.S. PATENT DOCUMENTS

| | | | |
|---|---|---|---|
| 2009/0310042 A1* | 12/2009 | Vidal ................ | G02F 1/133603 349/8 |
| 2012/0170002 A1* | 7/2012 | Ouderkirk ............ | H04N 9/3173 353/30 |
| 2013/0077283 A1* | 3/2013 | Li ............................ | H04N 9/31 362/19 |

* cited by examiner

*Primary Examiner* — Jerry L Brooks

(57) ABSTRACT

A compound eye illumination system for an LCD projector includes: an LED light source, an LED collector, a fly-eye lens, an overlapping lens, a focusing lens, an LCD light valve, a field lens, and a projection lens, which are arranged in sequence according to a light travelling direction. The compound eye illumination system further includes: a quarter wave plate and a brightness-enhancing polarizer, which are sequentially arranged between the LED collector and the fly-eye lens according to the light travelling direction. According to the present invention, a polarized light passes through the quarter wave plate twice to complete polarization conversion. As a result, lighting efficiency of the projector is significantly improved and power consumption is saved, which greatly improves the product competitiveness. Moreover, the overall structure is simple, the volume is relatively small, the production is easy, and the price is low.

6 Claims, 4 Drawing Sheets

COMPOUND EYE ILLUMINATION SYSTEM AND PROJECTION METHOD OF LCD PROJECTOR

CROSS REFERENCE OF RELATED APPLICATION

The present invention claims priority under 35 U.S.C. 119(a-d) to CN 202011220122.3, filed Nov. 4, 2020.

BACKGROUND OF THE PRESENT INVENTION

Field of Invention

The present invention relates to a technical field of projector, and more particularly to a compound eye illumination system and a projection method of an LCD projector.

Description of Related Arts

For a long time, the transmissive single LCD projector illuminates its liquid crystal molecules with linearly polarized light and produces bright and dark images through the analyzer, wherein the illuminating light from the light source can almost be regarded as natural light. As a result, during the polarization process from natural light to linearly polarized light, about ≥50% of the light is filtered by the polarizer of the LCD light valve. Considering the requirement of the LCD light valve for the extinction ratio of the polarizer, the total polarization efficiency of the polarizer is usually ≤38%-45%. This lighting loss alone will cause 55%-62% of the energy of a single LCD projector to do useless work, which fundamentally affects the efficiency of the optical system of the single LCD projector, and fundamentally increases the heat dissipation burden of the projector optical system, thereby fundamentally limiting the performance and application of the single LCD projector.

Polarized light conversion technology is one of the most important ways to reduce the above-mentioned lighting loss. The polarized light conversion technology corresponding to compound eye system has been very mature overseas in the past 20 years, and has been widely used in 3LCD and other projectors. A typical structure is shown in FIGS. 6-7 (described below).

At the same time single LCD projectors have always been accustomed to the simple Kohler lighting method, leading to not only low lighting efficiency, but also low image uniformity. As a result, more heat is accumulated in the central area of the light valve and local temperature rise of the light valve is very high. Furthermore, with the inherent limitations of LCD light valve cooling technology, output brightness of the product is further affected, and user satisfaction is low. Therefore, the present invention aims to provide a more efficient LCD projector lighting solution, such as polarized light conversion with low cost, good quality and simple production, to achieve higher lighting efficiency, better uniform lighting for critical lighting technology, and further improvement of lighting efficiency.

SUMMARY OF THE PRESENT INVENTION

An object of the present invention is to overcome shortcomings of the prior art and provide a compound eye illumination system for LCD projectors, which effectively improves illumination efficiency and illumination uniformity of the single LCD projector, and is simple to manufacture, inexpensive, and good in quality.

Accordingly, in order to accomplish the above objects, the present invention provides a compound eye illumination system for an LCD (liquid crystal display) projector, comprising: an LED (light-emitting diode) light source, an LED collector, a fly-eye lens, an overlapping lens, a focusing lens, an LCD light valve, a field lens, and a projection lens, which are arranged in sequence according to a light travelling direction, wherein the LED light source comprises a thermally conductive substrate, wherein a light-emitting area is provided on the thermally conductive substrate, and a light-emitting chip is installed within the light-emitting area; a reflective film for reflecting light is also provided within the light-emitting area but not overlaps with the light-emitting chip;

at least one LED light source is used;

the LED collector and the LED light source are equal in quantity and opposite in position;

the compound eye illumination system further comprises: a quarter wave plate and a brightness-enhancing polarizer, which are sequentially arranged between the LED collector and the fly-eye lens according to the light travelling direction; or the compound eye illumination system further comprises: a quarter wave plate and a brightness-enhancing polarizer, which are sequentially arranged between the fly-eye lens and the overlapping lens according to the light travelling direction; or the compound eye illumination system further comprises: a quarter wave plate and a brightness-enhancing polarizer, which are sequentially arranged between the overlapping lens and the focusing lens according to the light travelling direction; or the compound eye illumination system further comprises: a quarter wave plate and a brightness-enhancing polarizer, which are sequentially arranged between the focusing lens and the LCD light valve according to the light travelling direction.

Preferably, the light-emitting area is rectangular, and an aspect ratio thereof is identical to an aspect ratio of a sub-lens of the fly-eye lens; a long side of the light-emitting area is parallel to a length of the sub-lens of the fly-eye lens. The light-emitting area can also be circular or other shapes, which is not limited to be rectangular.

Preferably, the brightness-enhancing polarizer is a linear polarizer, and a transmission axis of the brightness-enhancing polarizer is consistent with a polarization plane of an incident polarized light required by the LCD light valve; the brightness-enhancing polarizer transmits a linearly polarized light required by the LCD light valve; a reflection axis and the transmission axis of the brightness-enhancing polarizer are orthogonal with each other, and the brightness-enhancing polarizer reflects a linearly polarized light orthogonal to a polarization plane of the transmission axis of the brightness-enhancing polarizer.

Preferably, an angle formed by a fast axis of the quarter wave plate and a transmission axis of the brightness-enhancing polarizer is +45°, −45°, +135°, or −135°.

Alternatively, the quarter wave plate comprises two one-eighth wave plates; an angle formed by an equivalent fast axis of the two one-eighth wave plates and a transmission axis of the brightness-enhancing polarizer is +45°, −45°+135°, or −135°.

Preferably, the brightness-enhancing polarizer is installed on a diaphragm between the overlapping lens and the focusing lens.

Preferably, the LED collector is a condenser lens group, a conical condenser, a reflector, or a TIR lens; wherein the condenser lens group comprises a lens for focusing and collimating the LED light source; or the LED collector is a combination of a conical condenser and a collimating lens group, or the LED collector is a combination of a reflector and a collimating lens group; wherein the collimating lens group comprises a lens for collimating light.

Preferably, the fly-eye lens is a single-sided fly-eye lens, a combination of two single-sided fly-eye lenses, or a double-sided fly-eye lens.

The present invention also provides a projecting method of a compound eye illumination system for an LCD projector, comprising steps of:

collecting and collimating a light emitted from an LED light source with an LED collector before the light passes through a quarter wave plate and reaches a brightness-enhancing polarizer; separating the light by the brightness-enhancing polarizer, transmitting a polarized light useful to an LCD light valve, and reflecting a polarized light useless to the LCD light valve, wherein the two polarized lights are linearly polarized lights with equal amplitude and orthogonal vibration planes; uniformly illuminating the LCD light valve with the polarized light useful to the LCD light valve after the polarized light useful to the LCD light valve sequentially passes through the brightness-enhancing polarizer, a fly-eye lens, an overlapping lens and a focusing lens, and projecting the polarized light useful to the LCD light valve through a field lens and a projection lens: reflecting the polarized light useless to the LCD light valve back to the quarter wave plate by the brightness-enhancing polarizer, in such a manner that the polarized light useless to the LCD light valve passes through the quarter wave plate and the LED collector, and reaches a light-emitting area of the LED light source; wherein a part of the polarized light useless to the LCD light valve is reflected by a reflective film, and a reflected light then passes through the LED collector and the quarter wave plate, and reaches the brightness-enhancing polarizer; after passing through the quarter wave plate twice, a polarization plane of the reflected light is rotated by 90° to be consistent with a transmission axis of the brightness-enhancing polarizer, in such a manner that the polarized light useless to the LCD light valve becomes useful to the LCD light valve, thereby completing polarization conversion; or collecting and collimating a light emitted from an LED light source with an LED collector before the light reaches a fly-eye lens and is separated into multiple sub-lights, wherein the sub-lights pass through a quarter wave plate and reaches a brightness-enhancing polarizer; separating the sub-lights by the brightness-enhancing polarizer, transmitting a polarized light useful to an LCD light valve, and reflecting a polarized light useless to the LCD light valve, wherein the two polarized lights are linearly polarized lights with equal amplitude and orthogonal vibration planes; uniformly illuminating the LCD light valve with the polarized light useful to the LCD light valve after the polarized light useful to the LCD light valve sequentially passes through the brightness-enhancing polarizer, an overlapping lens and a focusing lens, and projecting the polarized light useful to the LCD light valve through a field lens and a projection lens: reflecting the polarized light useless to the LCD light valve back to the quarter wave plate by the brightness-enhancing polarizer, in such a manner that the polarized light useless to the LCD light valve passes through the quarter wave plate, the fly-eye lens, and the LED collector, and reaches a light-emitting area of the LED light source; wherein a part of the polarized light useless to the LCD light valve is reflected by a reflective film, and a reflected light then passes through the LED collector, the fly-eye lens, and the quarter wave plate, and reaches the brightness-enhancing polarizer: after passing through the quarter wave plate twice, a polarization plane of the reflected light is rotated by 90° to be consistent with a transmission axis of the brightness-enhancing polarizer, in such a manner that the polarized light useless to the LCD light valve becomes useful to the LCD light valve, thereby completing polarization conversion; or collecting and collimating a light emitted from an LED light source with an LED collector before the light reaches a fly-eye lens and is separated into multiple sub-lights, wherein the sub-lights pass through an overlapping lens, a quarter wave plate and reaches a brightness-enhancing polarizer; separating the sub-lights by the brightness-enhancing polarizer, transmitting a polarized light useful to an LCD light valve, and reflecting a polarized light useless to the LCD light valve, wherein the two polarized lights are linearly polarized lights with equal amplitude and orthogonal vibration planes; uniformly illuminating the LCD light valve with the polarized light useful to the LCD light valve after the polarized light useful to the LCD light valve sequentially passes through the brightness-enhancing polarizer and a focusing lens, and projecting the polarized light useful to the LCD light valve through a field lens and a projection lens; reflecting the polarized light useless to the LCD light valve back to the quarter wave plate by the brightness-enhancing polarizer, in such a manner that the polarized light useless to the LCD light valve passes through the quarter wave plate, the overlapping lens, the fly-eye lens, and the LED collector, and reaches a light-emitting area of the LED light source; wherein a part of the polarized light useless to the LCD light valve is reflected by a reflective film, and a reflected light then passes through the LED collector, the fly-eye lens, the overlapping lens, and the quarter wave plate, and reaches the brightness-enhancing polarizer; after passing through the quarter wave plate twice, a polarization plane of the reflected light is rotated by 90° to be consistent with a transmission axis of the brightness-enhancing polarizer, in such a manner that the polarized light useless to the LCD light valve becomes useful to the LCD light valve, thereby completing polarization conversion; or collecting and collimating a light emitted from an LED light source with an LED collector before the light passes through a fly-eye lens, an overlapping lens, a focusing lens, and a quarter wave plate, and reaches a brightness-enhancing polarizer; separating the sub-lights by the brightness-enhancing polarizer, transmitting a polarized light useful to an LCD light valve, and reflecting a polarized light useless to the LCD light valve, wherein the two polarized lights are linearly polarized lights with equal amplitude and orthogonal vibration planes: uniformly illuminating the LCD light valve with the polarized light useful to the LCD light valve after the polarized light useful to the LCD light valve passes through the brightness-enhancing polarizer, and projecting the polarized light useful to the LCD light valve through a field lens and a projection lens; reflecting the polarized light useless to the LCD light valve back to the quarter wave plate by the brightness-enhancing polarizer, in such a manner that the polarized light useless to the LCD light valve passes through the quarter wave plate, the focusing lens, the overlapping lens, the fly-eye lens, and the LED collector, and reaches a light-emitting area of the LED light source; wherein a part of the polarized light useless to the LCD light valve is reflected by a reflective film, and a reflected light then passes through the LED collector, the fly-eye lens, the overlapping lens, the focusing lens, and the quarter wave plate, and reaches the brightness-enhancing polarizer: after passing through the quarter wave plate twice, a polarization plane of the reflected light is rotated by 90° to be consistent with a transmission axis of the brightness-enhancing polarizer, in such a manner that the polarized light useless to the LCD light valve becomes useful to the LCD light valve, thereby completing polarization conversion.

Beneficial Effects of the Present Invention

In the present invention, the light is polarized by the brightness-enhancing polarizer, wherein the polarized light useful to the LCD light valve is transmitted, and the polarized light useless to the LCD light valve is reflected. The reflected light enters the LED collector and reaches the light-emitting area of the LED light source, wherein a part of the polarized light useless to the LCD light valve is reflected by the reflective film in the light-emitting area, and a reflected light then passes through the LED collector and the optical system, and reaches the brightness-enhancing polarizer; after passing through the quarter wave plate twice, a polarization plane of the reflected light is rotated by 90° to be useful to the LCD light valve. Furthermore, the enhanced light has no excessive light spread, so it is fully used by the LCD light valve. As a result, lighting efficiency of the projector is significantly improved, power consumption is saved, and heat generation of the optical system is reduced. Meanwhile, uniform illumination of the LCD light valve is realized, which greatly improves the product competitiveness. Moreover, the overall structure of the present invention is simple, the volume is relatively small, the production is easy, and the price is low.

BRIEF DESCRIPTION OF THE DRAWINGS

In order to explain the embodiments of the present invention or the technical solutions in the prior art more clearly, drawings of the embodiments or the prior art will be briefly introduced below. Obviously, the drawings as described below are only some embodiments of the present invention. For those of ordinary skill in the art, other drawings can be obtained from these drawings without creative work.

DETAILED DESCRIPTION OF THE PREFERRED EMBODIMENT

Figure 1:
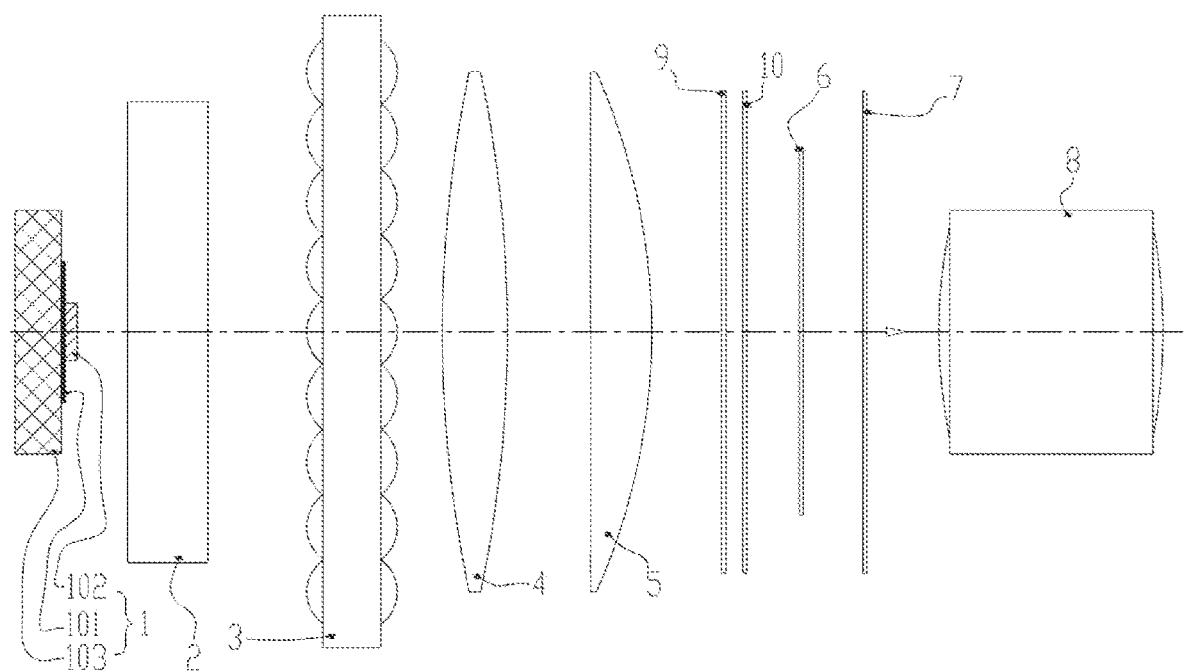
FIG. 1 is a structure diagram of an embodiment 1 of the present invention.

In order to describe the technical solutions of the present invention more clearly to those skilled in the art, the present invention will be described in detail below with reference to the accompanying drawings. The description in this section is only exemplary and explanatory, and should not have any limiting effect on the protection scope of the present invention.

It should be noted that similar reference numerals and letters indicate similar items in the drawings. Therefore, once an item is defined in one drawing, it does not need to be further defined and explained in the subsequent drawings.

It should be noted that the terms "center", "upper", "lower", "left", "right", "vertical". "horizontal", "inner". "outer", etc. indicate the orientation or positional relationships based on those shown in the drawings, or the orientation or position relationships usually occur when the product of the present invention is used, which are only for the convenience of describing the present invention and simplifying the description, rather than indicating or implying that the device or element referred to must adopt a specific orientation, or is constructed and operated in a specific orientation. Therefore, such terms cannot be understood as a limitation to the present invention. In addition, the terms "first", "second", "third", etc. are only used for distinguishing description, and cannot be understood as indicating or implying relative importance.

In addition, the terms "horizontal", "vertical", "overhanging", etc. do not mean that the component is required to be absolutely horizontal or overhang, but may be slightly inclined. For example, "horizontal" only means that the direction is more horizontal than "vertical", it does not mean that the structure must be completely horizontal, but can be slightly inclined.

In the description of the present invention, it should also be noted that, unless otherwise clearly specified and limited, the terms "set", "install", "connecting", and "connected" should be understood in a broad sense. For example, they may mean fixedly connected, detachably connected or integrally connected: they may mean mechanically connected or electrically connected: they may mean directly connected or indirectly connected through an intermediate medium, and they may mean the internal communication between two components. For those of ordinary skill in the art, the specific meaning of the above-mentioned terms in the present invention can be understood in specific situations.

Embodiment 1

Figure 2:
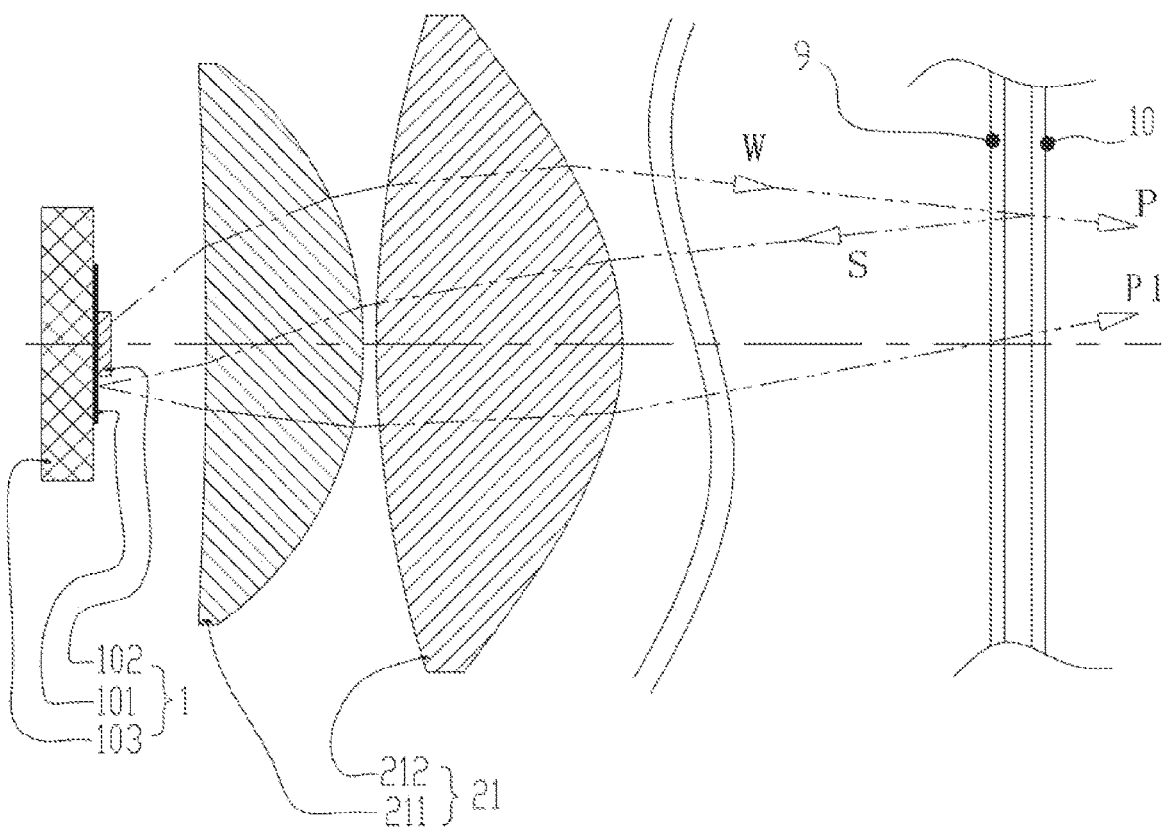
FIG. 2 illustrates principle of polarization conversion of the present invention, wherein an LED collector is a lens group, and the lens group comprises two lenses.
Figure 3:
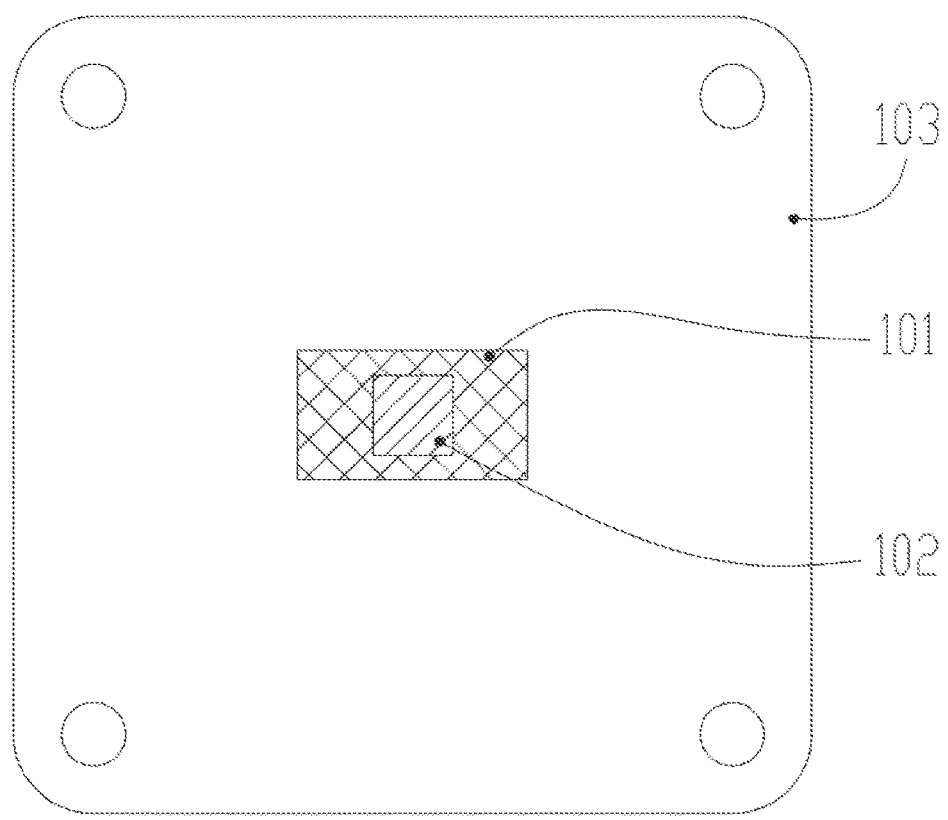
FIG. 3 is a structure diagram of an LED light source according to the embodiment of the present invention.

Referring to FIGS. 1-3, the present invention provides a compound eye illumination system for an LCD projector, comprising: an LED light source 1, an LED collector 2, a fly-eye lens 3, an overlapping lens 4, a focusing lens 5, a quarter wave plate 9, a brightness-enhancing polarizer 10, an LCD light valve 6, a field lens 7, and a projection lens 8, which are arranged in sequence according to a light travelling direction.

There is one or n LED light sources 1, and n≥2, which depends on a size of a light-emitting area on the LED light source 1 and light spread limitation of the LCD light valve 6 caused by Fno (aperture) of the projection lens 8.

If there is one LED light source 1, a structure is relatively simple, but a volume of the LED collector 2 will be relatively largest, and a production cost is high. If there are more than one LED light sources 1, assembly will be relatively troublesome, but the volume of the LED collector 2 will be relatively small, and heat dissipation of the LED light source 1 will be better.

Referring to FIG. 3, the light-emitting area of the LED light source 1 is rectangular. The light-emitting area can also be circular or other shapes, but as long as the shape of the light-emitting area is different from a shape of a sub-lens of the fly-eye lens 3, more useless light may enter the system, which is not conducive to heat dissipation; or light spread will be wasted, which cannot provide best system efficiency.

The LED collector 2 collects and converts luminous flux as much as possible of the LED light source 1 into a numerical aperture which is allowed by the fly-eye lens 3, so as to illuminate the fly-eye lens 3.

The number of rows and columns of the fly-eye lens 3, the size of the sub-lens, a surface shape, the numerical aperture, materials and other parameters mainly depend on trade-off between system efficiency and cost.

The fly-eye lens 3 has a natural useless light limiting effect, so there is no excessive light spread according to the present invention, and there is no meaningless illumination and heating to the LCD light valve 6, which are fundamentally different from many current pseudo-polarized light conversion technologies. Although the current pseudo-polarized light conversion technology does increase the amount of light reaching the light valve to a certain extent, brightness of projected images does not increase, so heat dissipation burden of the light valve is increased for nothing.

The overlapping lens 4 overlaps (superimposes) multiple sub-light source images divided by the fly-eye lens 3 on the LCD light valve 6 through the focusing lens 5.

The quarter wave plate 9 and the brightness-enhancing polarizer 10 are made on a piece of 0.5 mm-thick glass. An incident side of the glass is pasted with the quarter wave plate 9 and an emergent side is pasted with the brightness-enhancing polarizer 10. The quarter wave plate 9 and the brightness-enhancing polarizer 10 can be made of organic materials which have low price and stable supply. For example, the quarter wave plate 9 can adopt current quarter wave plate produced by Teijin Japan, and the brightness-enhancing polarizer 10 can adopt current DBEF brightness-enhancing polarizer of 3M Company, which will not be specifically limited.

If the brightness-enhancing polarizer 10 is installed in different positions, like between the LED collector 2 and the fly-eye lens 3, or between the fly-eye lens 3 and the overlapping lens 4, or between the overlapping lens 4 and the focusing lens 5, or between the focusing lens 5 and the LCD light valve 6, increase of projector lighting efficiency is different. When the brightness-enhancing polarizer 10 is placed between the fly eye lens 3 and the overlapping lens 4, or between the overlapping lens 4 and the focusing lens 5, the projector lighting efficiency is the best, followed by being placed between the focusing lens 5 and the LCD light valve 6. The efficiency will be low when the brightness-enhancing polarizer 10 is placed between the LED collector 2 and the fly-eye lens 3.

Referring to FIG. 2, the LED collector 2 adopts a condenser lens group 21, The condenser lens group comprises a first lens 211 and a second lens 212 arranged in sequence according to the light traveling direction. When a light W emitted by any point on a light-emitting chip 102 arranged in the light-emitting area of the LED light source 1 is spread by the brightening polarizer 10, a P light is transmitted and an S light is reflected. The reflected S light passes through the quarter wave plate 9, the second lens 212 and the first lens 211, and reaches the light-emitting area of the LED light source 1. Then the S light is efficiently reflected by a reflective film 101 in the light-emitting area, and passes through the first lens 211, the second lens 212, and the quarter wave plate 9. At this time, the S light passes through the quarter wave plate 9 twice, wherein a polarization plane of the S light is rotated by 90° to become a P light. The P1 light is transmitted by the brightness-enhancing polarizer 10 to complete a polarization conversion process, so as to be fully used by the LCD light valve 6. As a result, lighting efficiency of the projector is significantly improved, power consumption is saved, and heat generation of the optical system is reduced. Meanwhile, uniform illumination of the LCD light valve 6 is realized, which greatly improves the product competitiveness.

Embodiment 2

Figure 4:
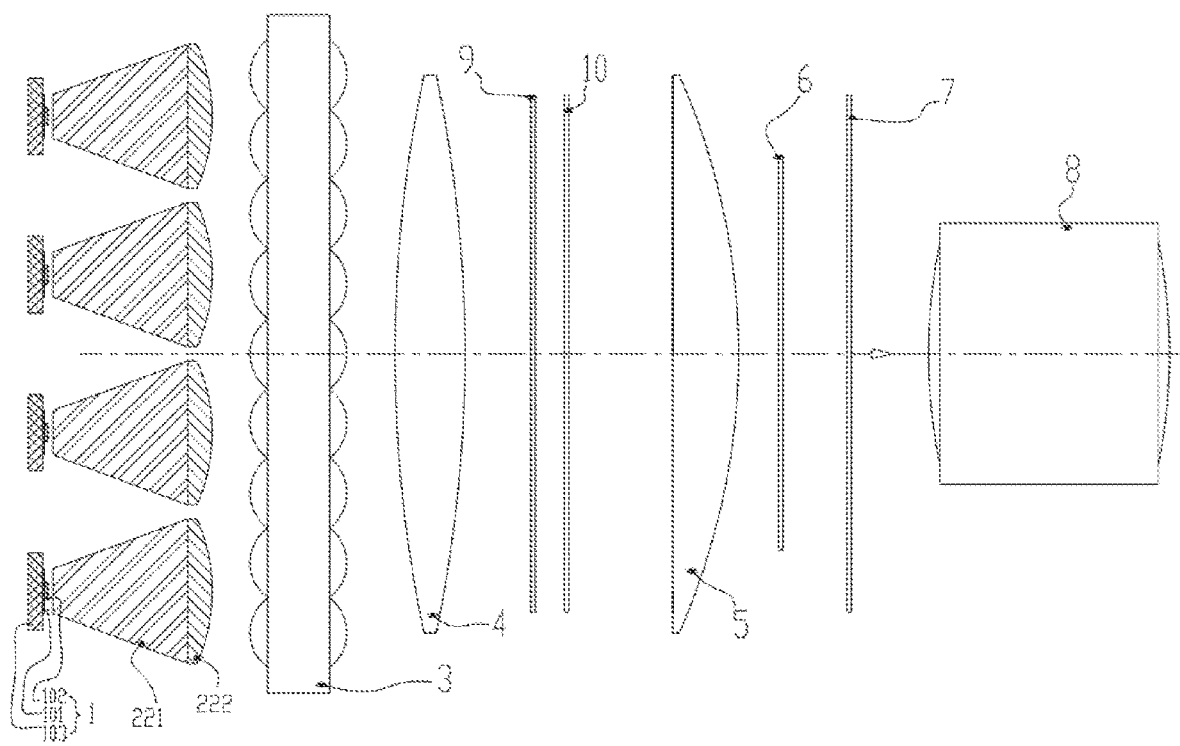
FIG. 4 is a structure diagram of an embodiment 2 of the present invention.

Referring to FIGS. 3-4, the present invention provides a compound eye illumination system for an LCD projector, comprising: an LED light source 1, an LED collector 2, a fly-eye lens 3, an overlapping lens 4, a quarter wave plate 9, a brightness-enhancing polarizer 10, a focusing lens 5, an LCD light valve 6, a field lens 7, and a projection lens 8, which are arranged in sequence according to a light travelling direction.

The LED collector 2 is a combination of a conical condenser 221 and a collimating lens group 222. The conical condenser 221 is a solid square cone light guide rod, and the collimating lens group 222 is a plano-convex lens. The conical condenser 221 and the collimating lens group 222 are glued together into a small module to facilitate production and installation.

8 groups of LED light sources 1 together form a 4×2 array light source module, wherein a size of the light-emitting chip 102 of each group of the LED light sources 1 is 1.2 mm*1.5 mm, and luminous flux is 1000 Lm (lumens). A total power of the 8 groups is 72 W. The light-emitting area of each group of the LED light sources 1 is 1.5 mm*2.55 mm. The reflective film 101 is provided within this 1.5 mm*2.55 mm rectangular area but not overlaps with the 1.2 mm*1.5 mm area of the light-emitting chip 102. The light-emitting chip 102 is arranged in a center of the light-emitting area, as shown in FIG. 3.

The LED collector 2 and the LED light source 1 is equal in quantity and opposite in positions, which means there are 8 LED collectors 2. A long side of the rectangular light-emitting area on the LED light source 1, long sides of the incident and emergent surfaces of the square cone light guide rod, and a long side of the sub-lens of the fly-eye lens 3 are parallel.

The LCD light valve 6 is a 3.5-inch full-color FHD light valve.

Specifically, the brightness-enhancing polarizer 10 is installed near a diaphragm between the overlapping lens 4 and the focusing lens 5. This "near", referring to the optical system of present invention, is within a range of about 2 mm before and after the diaphragm.

The focusing lens 5 focuses the sub-light source images on the fly-eye lens 3 on the LCD light valve 6. The illumination system of the embodiment 2 is a typical critical illumination mode.

According to the foregoing structure, when the quarter wave plate 9 and the brightness-enhancing polarizer 10 are not used, output luminous flux of the projector is about 315 Lm. Compared with the current simple Kohler illumination method (maximum output of 180 Lm at 72 W), the optical system efficiency is increased by about 1.8 times, which is highly efficiency. In addition, uniformity is much better than that of Kohler lighting. When the quarter wave plate 9 and the brightness-enhancing polarizer 10 are installed, the projector output is about 468 Lm, which further improves the efficiency.

Embodiment 3

Figure 5:
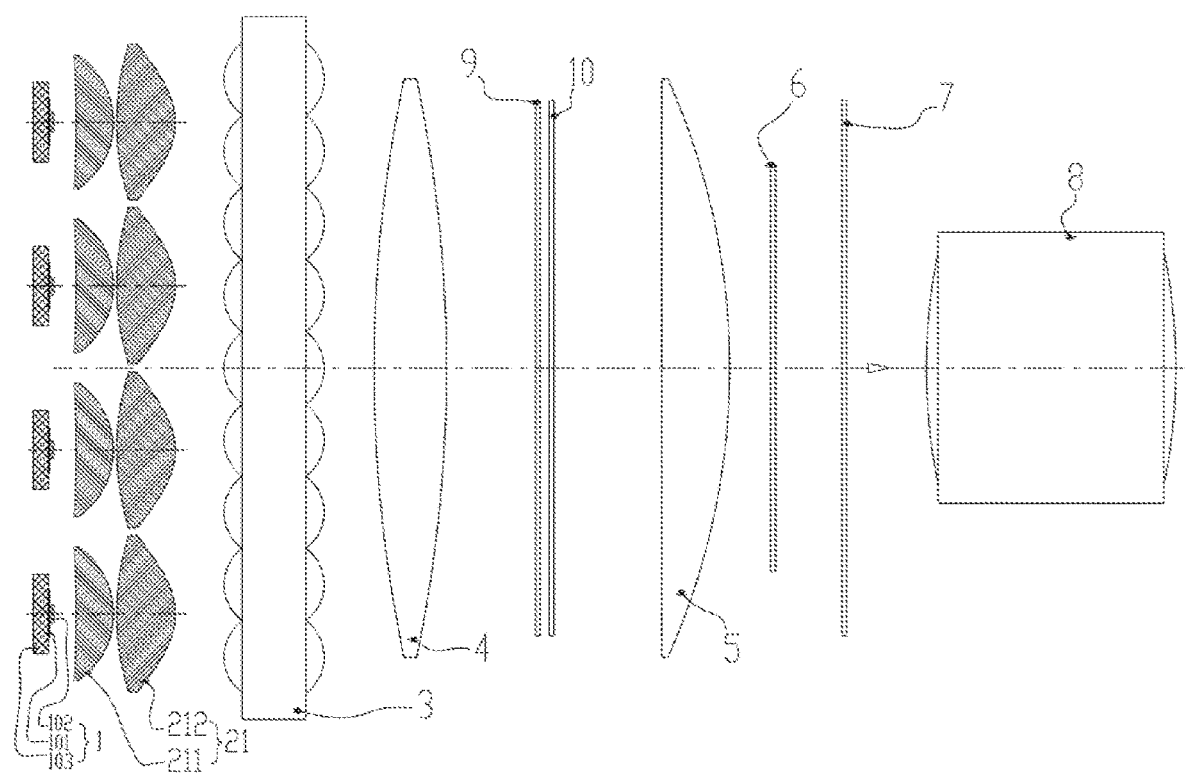
FIG. 5 is a structure diagram of an embodiment 3 of the present invention.

Referring to FIGS. 2-3 and 5, the present invention provides a compound eye illumination system for an LCD projector, comprising: an LED light source 1, an LED collector 2, a fly-eye lens 3, an overlapping lens 4, a quarter wave plate 9, a brightness-enhancing polarizer 10, a focusing lens 5, an LCD light valve 6, a field lens 7, and a projection lens 8, which are arranged in sequence according to a light travelling direction.

The LED collector 2 is a condensing lens group 21, and the condensing lens group 21 comprises a first lens 211 and a second lens 212 sequentially arranged according to the light traveling direction.

In the embodiment 3, the LED light source 1 and the LCD light valve 6 are the same as those in the embodiment 2.

Compared with the embodiment 2, The output brightness of the projector is lower, which is only 425 Lm. However, compared with the luminous efficiency of the current single LCD projector, which is less than 3 Lm/W, the luminous efficiency of the embodiment 3 is very amazing, which is up to 5.9 Lm/W.

Figure 6:
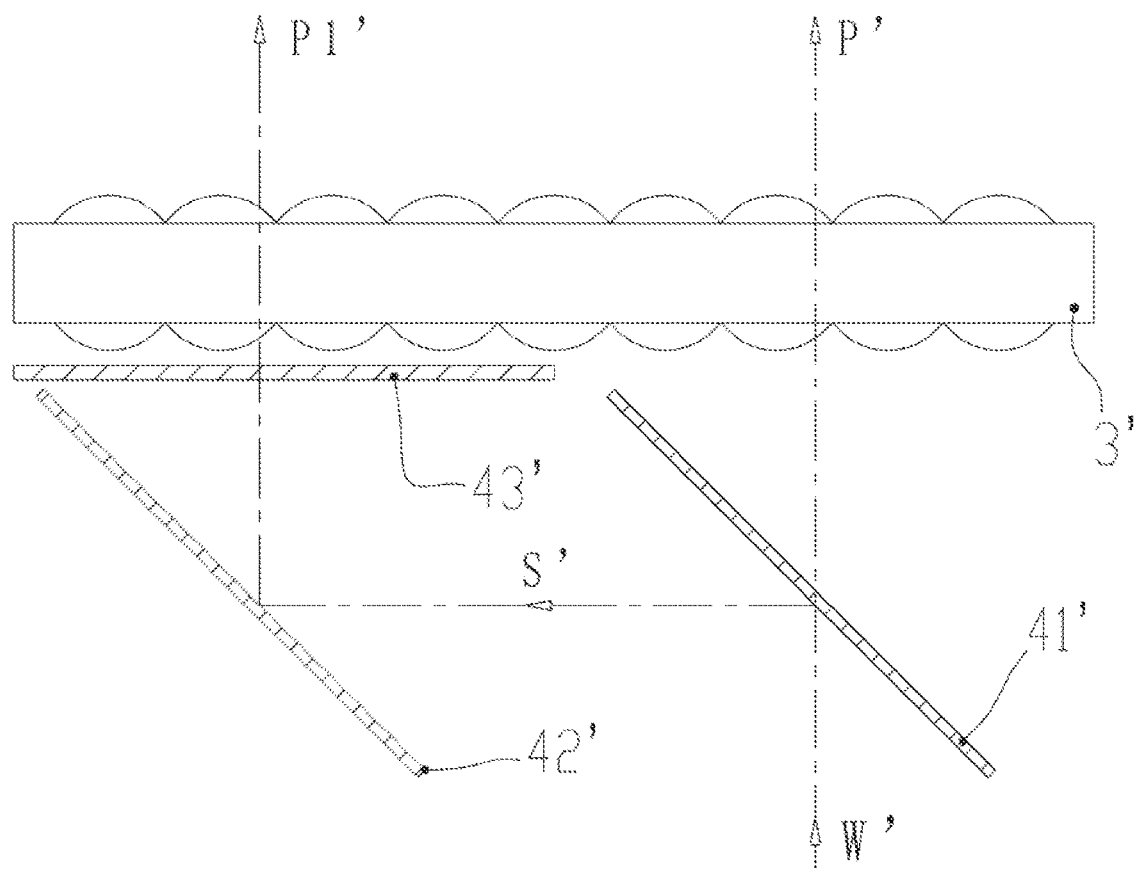
FIG. 6 is a structure diagram of a prior art.

FIG. 6 illustrates the polarization conversion technology of early 3LCD projectors, such as products of 3M and Epson. There were a lot of such products on the market it the end of the last century.

Natural light W' with a certain numerical aperture reaches a PBS beam splitter 41' (which is usually a PBS prism with huge volume and high cost), then P' light is transmitted and enters a fly-eye lens 3' for differential division, and S' light is reflected. S' continues to move forward, which is then reflected by a total reflection mirror 42' and reaches a half-wave plate 43'. The light passing through the half-wave plate 43' is rotated by 90° to become P' and enters the fly-eye lens 3' for differential division. P' and P1' are both linearly polarized light with same polarization plane.

Figure 7:
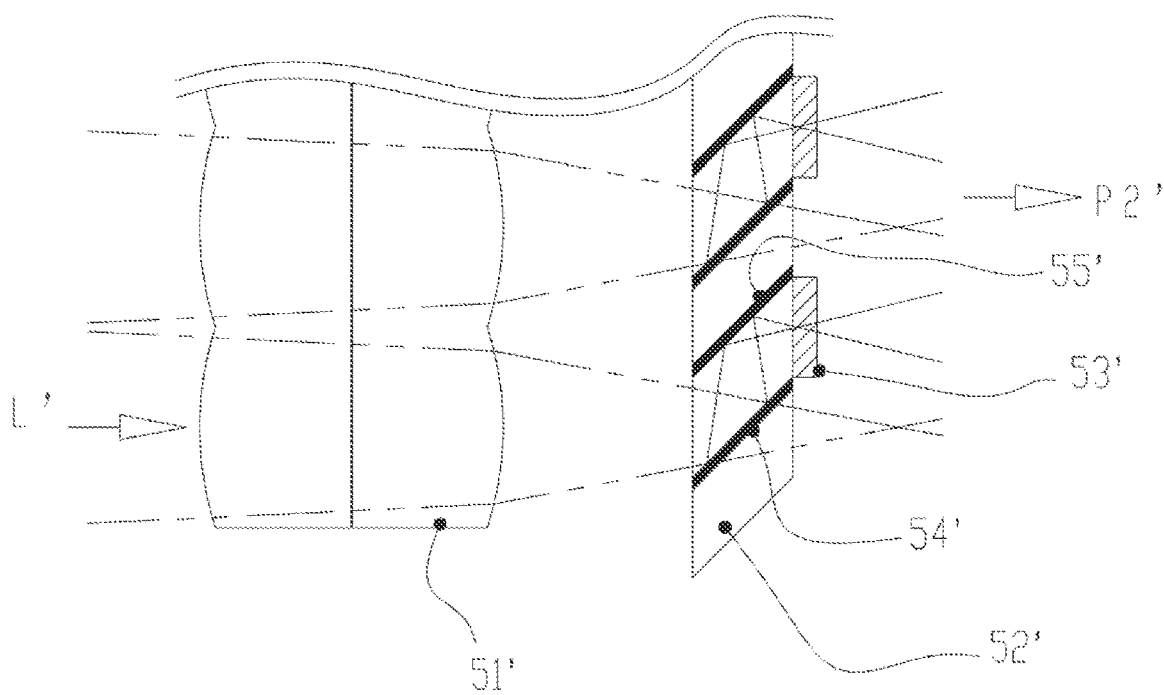
FIG. 7 is a structure diagram of another prior art.

FIG. 7 illustrates the basic principle structure of polarization conversion of 3LCD projectors in the past 20 years. Natural light L' with a certain numerical aperture is divided by the fly eye lens 51' and reaches a PBS prism module 52'. The prism module 52' is formed by gluing a plurality of rhombic prisms. A PBS spectroscopic film is provided on a glued surface 54', and a total reflection film is provided on a glued surface 55'. Light emitted from the fly-eye lens 51' enters the PBS prism module 52'. After the light is split by the PBS film, a linearly polarized light of a P vibration surface passes through the PBS prism module 52' and is emitted, and a linearly polarized light of a S vibration surface is reflected by the total reflection film on the glued surface 55' and emitted through a half-wave plate 53'. Therefore, the lights emitted from the PBS prism module 52' are all linearly polarized light P2' with same polarization plane.

The above two polarization conversion processes are very classic engineering techniques, but they are not suitable for single LCD projectors, because the most fundamental difference between single LCD projectors and 3LCD projectors is that the area of the light valve is different by orders of magnitude. The technology shown in FIG. 6 was applied to early 3LCD projectors. The light valve size is about 1.3 inches, while the light valve size of single LCD projectors in the same period was generally 6.4-10.4 inches. The technology shown in FIG. 7 is widely used in current 3LCD projectors. The valve size is generally 0.5-0.6 inches, while the single LCD projector is about 3.5-8 inches. Because of the differences in area and volume of the polarized light splitting components (such as the PBS prisms), the classic polarization conversion technology of the 3LCD projectors with cost and manufacturing difficulties cannot be applied to the relatively cheap single LCD projector. Moreover, the above PBS prism module 52' has very high production requirements, which is only supplied by one or two companies in the world.

Compared with these traditional and classic polarization conversion technologies, the present invention is more suitable for the single LCD projector. The present invention significantly improves the lighting efficiency of the projector, saves power consumption, and reduces heat generation of the optical system. At the same time, uniform illumination of the LCD light valve is realized, which greatly improves the product competitiveness. In addition, the overall structure of the present invention is simple, the volume is relatively small, the production is easy, the quality is high and the price is low.

The basic principles, main features and advantages of the present invention have been shown and described above. Those skilled in the art should understand that the present invention is not limited by the above-mentioned embodiments. These embodiments and the description only illustrate the principles of the present invention. Therefore, without departing from the spirit and scope of the present invention, there will be various changes and improvements to the present invention, and these changes and improvements all fall within the scope of the claimed invention. The scope of protection claimed by the present invention is defined by the appended claims and their equivalents.

What is claimed is:

1. A compound eye illumination system for an LCD (liquid crystal display) projector, comprising: an LED (light-emitting diode) light source (1), an LED collector (2), a fly-eye lens (3), an overlapping lens (4), a focusing lens (5), an LCD light valve (6), a field lens (7), and a projection lens (8), which are arranged in sequence according to a light travelling direction; wherein the LED light source (1) comprises a thermally conductive substrate (103), wherein a light-emitting area is provided on the thermally conductive substrate (103), and a light-emitting chip (102) is installed within the light-emitting area; a reflective film (101) for reflecting light is also provided within the light-emitting area but not overlaps with the light-emitting chip (102);

at least one LED light source (1) is used;

the LED collector (2) and the LED light source (1) are equal in quantity and opposite in position;

the compound eye illumination system further comprises: a quarter wave plate (9) and a brightness-enhancing polarizer (10), which are sequentially arranged between the LED collector (2) and the fly-eye lens (3) according to the light travelling direction; or the compound eye illumination system further comprises: a quarter wave plate (9) and a brightness-enhancing polarizer (10), which are sequentially arranged between the fly-eye lens (3) and the overlapping lens (4) according to the light travelling direction; or the compound eye illumination system further comprises: a quarter wave plate (9) and a brightness-enhancing polarizer (10), which are sequentially arranged between the overlapping lens (4) and the focusing lens (5) according to the light travelling direction; or the compound eye illumination system further comprises: a quarter wave plate (9) and a brightness-enhancing polarizer (10), which are sequentially arranged between the focusing lens (5) and the LCD light valve (6) according to the light travelling direction;

wherein the light-emitting area is rectangular, and an aspect ratio thereof is identical to an aspect ratio of a sub-lens of the fly-eye lens (3); a long side of the light-emitting area is parallel to a length of the sub-lens of the fly-eye lens (3).

2. The compound eye illumination system, as recited in claim 1, wherein the brightness-enhancing polarizer (10) is a linear polarizer, and a transmission axis of the brightness-enhancing polarizer (10) is consistent with a polarization plane of an incident polarized light required by the LCD light valve (6); the brightness-enhancing polarizer (10) transmits a linearly polarized light required by the LCD light valve (6); a reflection axis and the transmission axis of the brightness-enhancing polarizer (10) are orthogonal with each other, and the brightness-enhancing polarizer (10) reflects a linearly polarized light orthogonal to a polarization plane of the transmission axis of the brightness-enhancing polarizer (10).

3. The compound eye illumination system, as recited in claim 1, wherein an angle formed by a fast axis of the quarter wave plate (9) and a transmission axis of the brightness-enhancing polarizer (10) is +45°, −45°, +135°, or −135°; or
the quarter wave plate (9) comprises two one-eighth wave plates; an angle formed by an equivalent fast axis of the two one-eighth wave plates and a transmission axis of the brightness-enhancing polarizer (10) is +45°, −45°, +135°, or −135°.

4. The compound eye illumination system, as recited in claim 1, wherein the brightness-enhancing polarizer (10) is installed on a diaphragm between the overlapping lens (4) and the focusing lens (5).

5. The compound eye illumination system, as recited in claim 1, wherein the LED collector (2) is a condenser lens group (21), a conical condenser (221), a reflector, or a TIR (total internal reflection) lens; wherein the condenser lens group (21) comprises a lens for focusing and collimating the LED light source (1); or
the LED collector (2) is a combination of a conical condenser (221) and a collimating lens group (222), or the LED collector (2) is a combination of a reflector and a collimating lens group (222); wherein the collimating lens group (222) comprises a lens for collimating light.

6. The compound eye illumination system, as recited in claim 1, wherein the fly-eye lens (3) is a single-sided fly-eye lens, a combination of two single-sided fly-eye lenses, or a double-sided fly-eye lens.

\* \* \* \* \*